(12) United States Patent
Kai et al.

(10) Patent No.: US 12,505,379 B2
(45) Date of Patent: Dec. 23, 2025

(54) COMPUTER-READABLE RECORDING MEDIUM STORING MACHINE LEARNING PROGRAM, MACHINE LEARNING METHOD, AND INFORMATION PROCESSING DEVICE OF IMPROVING PERFORMANCE OF LEARNING SKIP IN TRAINING MACHINE LEARNING MODEL

(71) Applicant: FUJITSU LIMITED, Kawasaki (JP)

(72) Inventors: Yutaka Kai, Kawasaki (JP); Akihiko Kasagi, Kawasaki (JP); Yasushi Hara, Kunitachi (JP); Takumi Danjo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 942 days.

(21) Appl. No.: 17/460,373

(22) Filed: Aug. 30, 2021

(65) Prior Publication Data

US 2022/0147872 A1 May 12, 2022

(30) Foreign Application Priority Data

Nov. 6, 2020 (JP) ................. 2020-185813

(51) Int. Cl.
*G06N 20/00* (2019.01)
*G06N 3/045* (2023.01)
(Continued)

(52) U.S. Cl.
CPC ............. *G06N 20/00* (2019.01); *G06N 3/084* (2013.01)

(58) Field of Classification Search
CPC ...................................................... G06N 3/084
See application file for complete search history.

(56) References Cited

U.S. PATENT DOCUMENTS

| 2019/0095794 A1 | 3/2019 | Lopez et al. |
| 2019/0114547 A1 | 4/2019 | Jaganathan et al. |
| (Continued) | | |

FOREIGN PATENT DOCUMENTS

| CN | 110782017 A | 2/2020 |
| JP | H11-126199 A | 5/1999 |
| (Continued) | | |

OTHER PUBLICATIONS

Zhao, Hengyu et al.; "Layer-wise Performance Bottleneck Analysis of Deep Neural Networks"; Sep. 2017; Workshop on Architectures for Intelligent Machine 2017; pp. 1-5 (Year: 2017).*

(Continued)

*Primary Examiner* — Van C Mang
*Assistant Examiner* — Ezra J Baker
(74) *Attorney, Agent, or Firm* — Fujitsu Intellectual Property Center

(57) ABSTRACT

A non-transitory computer-readable recording medium storing a calculation processing program for causing a computer to execute processing, the processing including: calculating error gradients of a plurality of layers of a machine learning model that includes an input layer of the machine learning model at the time of machine learning of the machine learning model; selecting a layer of which the error gradient is less than a threshold as a suppression target of the machine learning; and controlling a learning rate and performing the machine learning on the layer selected as the suppression target in a certain period of time before the machine learning is suppressed.

9 Claims, 15 Drawing Sheets

(51) Int. Cl.
    *G06N 3/08*     (2023.01)
    *G06N 3/084*     (2023.01)
    *G06N 3/063*     (2023.01)

(56) References Cited

U.S. PATENT DOCUMENTS

| | | | |
|---|---|---|---|
| 2019/0205767 | A1 | 7/2019 | Zhang |
| 2019/0378014 | A1 | 12/2019 | Yamamoto et al. |
| 2021/0216866 | A1 | 7/2021 | Ito et al. |
| 2021/0397948 | A1* | 12/2021 | Hara ................ G06N 3/084 |

FOREIGN PATENT DOCUMENTS

| | | |
|---|---|---|
| JP | 2019-212206 A | 12/2019 |
| WO | 2019/239821 A1 | 12/2019 |

OTHER PUBLICATIONS

Zheng, Qinghe et al.; "Layer-wise learning based stochastic gradient descent method for the optimization of deep convolutional neural network"; 2019; Journal of Intelligent & Fuzzy Systems 37; pp. 5641-5654 (Year: 2019).*

Xiao, Xueli et al.; "Fast Deep Learning Training through Intelligently Freezing Layers"; Jul. 2019; iThings and IEEE GreenCom and IEEE Cyber, CPSCom and IEEE Smart Data; pp. 1225-1232 (Year: 2019).*

Ram Dubey, Shiv et al.; "diffGrad: An Optimization Method for Convolutional Neural Networks"; Oct. 2020; IEEE Transactions on Neural Networks and Learning Systems vol. 31 No Nov. 11, 2020; pp. 4500-4511 (Year: 2020).*

Hettinger, Chris et al.; "Forward Thinking: Building and Training Neural Networks One Layer at a Time"; Jun. 2017; arXiv; 1-9 (Year : 2017).*

Zhong, Zhao et al.; "Practical Block-wise Neural Network Architecture Generation"; 2018; IEEE/CVF Conference on Computer Vision and Pattern Recognition; 2423-2432 (Year: 2018).*

Singh, Bharat et al., "Layer-Specific Adaptive Learning Rates for Deep Networks", 2015 IEEE 14th International Conference on Machine Learning and Applications (ICMLA), IEEE, Dec. 9, 2015, pp. 364-368, XP032875752.

Zheng, Shuai et al., "Blockwise Adaptivity: Faster Training and Better Generalization in Deep Learning", May 23, 2019, pp. 1-40, XP055889123, Retrieved from the Internet: URL:https://arxiv.org/pdf/1905.09899.pdf.

Chen, Tianyi et al., "LAG: Lazily Aggregated Gradient for Communication-Efficient Distributed Learning", arxiv.org, Cornell University Library, 201 OLIN Library Cornell University Ithaca, NY 14853, May 30, 2018, pp. 1-25, XP080882266.

Extended European Search Report dated Feb. 18, 2022 for corresponding European Patent Application No. 21194157.0, 10 pages.

European Office Action mailed on Aug. 22, 2024 for corresponding European Patent Application No. 21194157.0, 6 pages.

Chinese Office Action mailed on Apr. 8, 2025 for corresponding Chinese Patent Application No. 202111075987.X, with English Translation, 23 pages.

Chinese Office Action issued Jan. 27, 2025 for corresponding Chinese Patent Application No. 202111075987.X, with English Translation, 27 pages.

\* cited by examiner

COMPUTER-READABLE RECORDING MEDIUM STORING MACHINE LEARNING PROGRAM, MACHINE LEARNING METHOD, AND INFORMATION PROCESSING DEVICE OF IMPROVING PERFORMANCE OF LEARNING SKIP IN TRAINING MACHINE LEARNING MODEL

CROSS-REFERENCE TO RELATED APPLICATION

This application is based upon and claims the benefit of priority of the prior Japanese Patent Application No. 2020-185813, filed on Nov. 6, 2020, the entire contents of which are incorporated herein by reference.

FIELD

The embodiments discussed herein are related to a non-transitory computer-readable storage medium storing a calculation processing program, a calculation processing method, and an information processing device.

BACKGROUND

For speed-up of machine learning of a machine learning model, use of a graphics processing unit (GPU) is effective, and in addition, to distribute processing to the plurality of GPUs is also effective. Up to now, speed-up has been achieved by mounting the plurality of GPUs in a node that is an information processing device and executing machine learning processing in parallel in the node. However, processing for aggregating gradient information between the GPUs and refection processing have needed time.

In such machine learning of the machine learning model, it is needed to frequently update a new learning portion each time of learning. Therefore, it is needed to set a learning rate (LR) that determines an update frequency to be higher. On the other hand, an existing learning portion, on which machine learning has been already completed, closer to an input side has a lower learning rate. In an extreme case, the learning rate is often set to zero. Although it is not necessary to execute machine learning processing on the portion of which the learning rate is zero, the processing for aggregating the gradient information, the reflection processing, and weight calculation processing are executed at the same frequency as that of the new learning portion, and many unnecessary processes are performed.

For this reason, in recent years, the Gradient Skip technology is used that identifies a layer that does not need machine learning and does not execute and skips calculation and aggregation processing (Allreduce processing) of gradient information ($\Delta m$).

Examples of the related art include as follows: Japanese Laid-open Patent Publication No. 2019-212206; International Publication Pamphlet No. WO 2019/239821; Japanese Laid-open Patent Publication No. 11-126199; and U.S. Patent Application Publication No. 2019/0378014.

SUMMARY

According to an aspect of the embodiments, there is provided a non-transitory computer-readable recording medium storing a calculation processing program for causing a computer to execute processing. In an example, the processing includes: calculating error gradients of a plurality of layers of a machine learning model that includes an input layer of the machine learning model at the time of machine learning of the machine learning model; selecting a layer of which the error gradient is less than a threshold as a suppression target of the machine learning; and controlling a learning rate and performing the machine learning on the layer selected as the suppression target in a certain period of time before the machine learning is suppressed.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

However, with the technology described above, it is possible to increase a speed by skipping machine learning. However, accuracy of machine learning is deteriorated depending on a layer in which machine learning is skipped or a timing of skipping, and there is a case where machine learning ends without reaching target accuracy.

In one aspect of the embodiments described below, there is provided a solution to achieve both of reduction in time before learning convergence and improvement in accuracy.

Embodiments of a calculation processing program, a calculation processing method, and an information processing device disclosed herein will be described in detail with reference to the drawings. Note that the embodiments do not limited the present embodiment. Furthermore, each of the embodiments may be appropriately combined within a range without inconsistency.

First Embodiment

Overall Configuration

Figure 1:
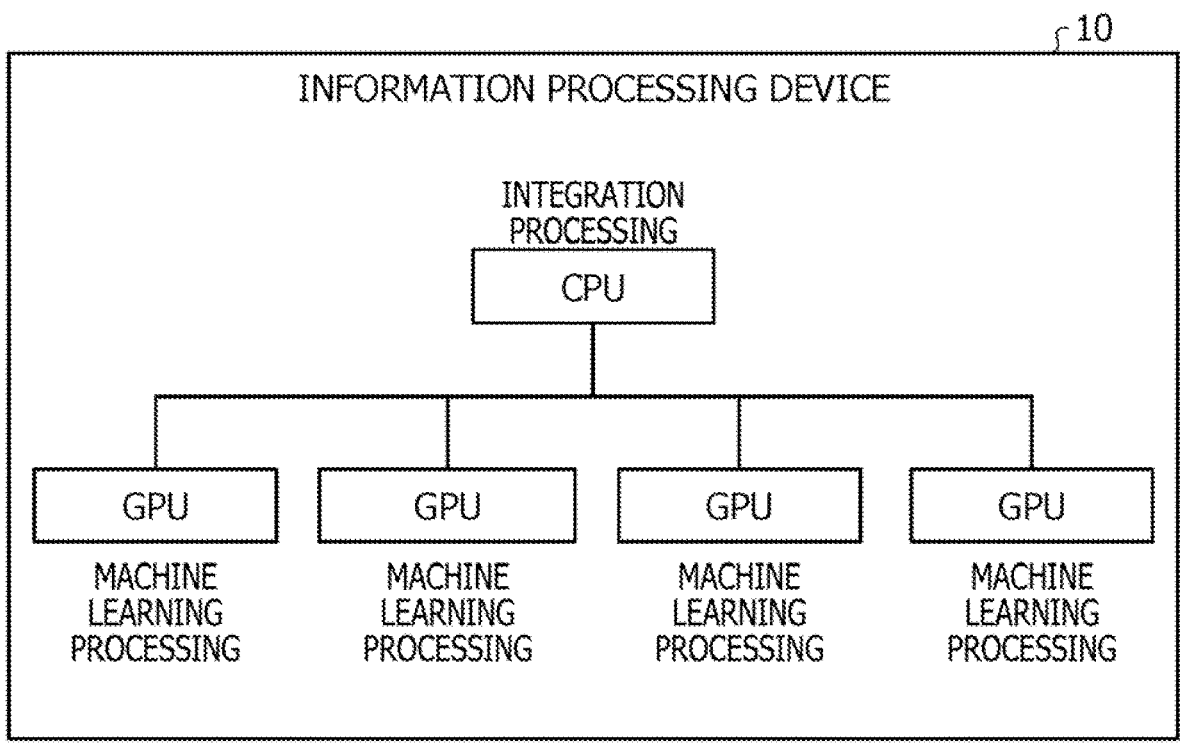
FIG. 1 is a diagram for explaining distributed learning of an information processing device according to a first embodiment.

An information processing device 10 according to a first embodiment generates a machine learning model through distributed processing using a plurality of GPUs in order to increase a speed of machine learning processing. FIG. 1 is a diagram for explaining distributed learning of the information processing device 10 according to the first embodiment. As illustrated in FIG. 1, the information processing device 10 is an example of a computer that includes a central processing unit (CPU) and the plurality of GPUs. The CPU controls the entire information processing device 10, and comprehensively manages the generation of the machine learning model. Each GPU performs machine learning of the machine learning model in response to an instruction from the CPU. Note that a known method can be adopted as a distributed processing method.

In recent years, the Gradient Skip technology is used that identifies a layer that does not need machine learning using a learning rate of each layer and suppresses (skip) learning without performing calculation and aggregation processing (Allreduce processing) of gradient information ($\Delta w$).

Figure 2:
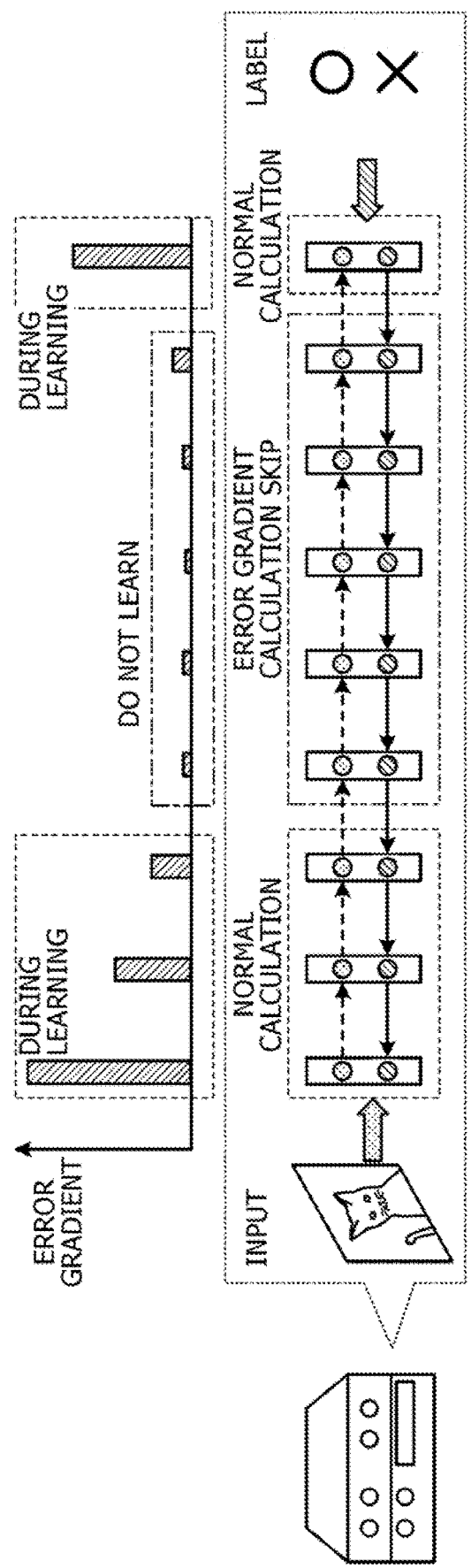
FIG. 2 is a diagram for explaining a reference technique of machine learning.

Here, a reference technique for learning skip will be described. FIG. 2 is a diagram for explaining a reference technique for machine learning. The reference technique illustrated in FIG. 2 is a technique for generating a machine learning model through deep learning (DL) or the like and is a technique for shortening a learning time by acquiring a learning status from error gradient of the DL and skipping the calculation of the error gradient.

Specifically, for example, the reference technique detects a layer in which a learning rate indicating a progress of learning is deteriorated and omits learning with respect to the layer so as to shorten the learning time. For example, in each layer in which a difference between an error gradient at the time of current iteration and an error gradient at the time of previous iteration is equal to or more than a threshold, learning is performed as usual at the time of next iteration. In each layer in which the difference is less than the threshold, learning skip is performed at the time of next iteration. In other words, for example, in the layer in which the learning rate is deteriorated, the subsequent machine learning processing for calculating an error gradient or the like is suppressed.

However, in the reference technique, an effect of accuracy deterioration in a case where the machine learning is completely skipped is partially unknown. In other words, for example, in the machine learning model such as a deep neural network (DNN), accuracy tends to be deteriorated in a case where backward propagation processing on a plurality of layers is determined with reference to the learning rate (LR) or the like and stopped at the same time. Furthermore, if the stop timing (the number of epochs and the number of iterations) is not proper, there is a case where the accuracy is deteriorated and the final accuracy does not reach the target.

Therefore, regarding a layer (layer) determined to be a learning skip target in which each processing such as the calculation of the error gradient and the backward propagation is suppressed, the information processing device 10 according to the first embodiment does not suddenly skip learning, gradually reduces a learning rate of the layer in which learning is stopped, executes learning processing to some extent, and then, skips learning.

Figure 3:
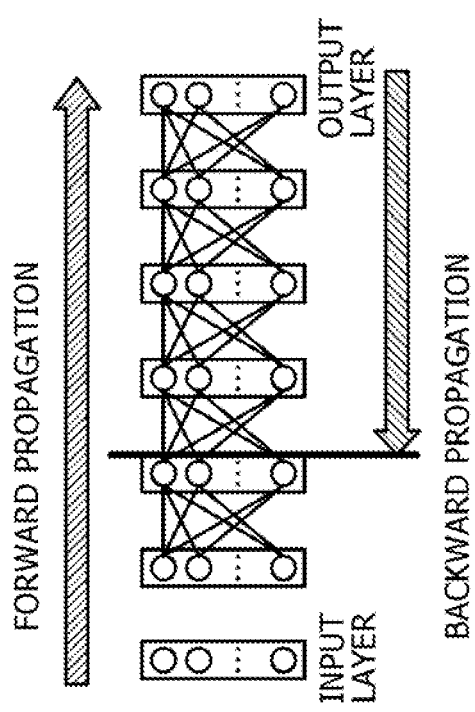
FIG. 3 is a diagram for explaining machine learning of the information processing device according to the first embodiment.
Figure 3:
Figure 3:
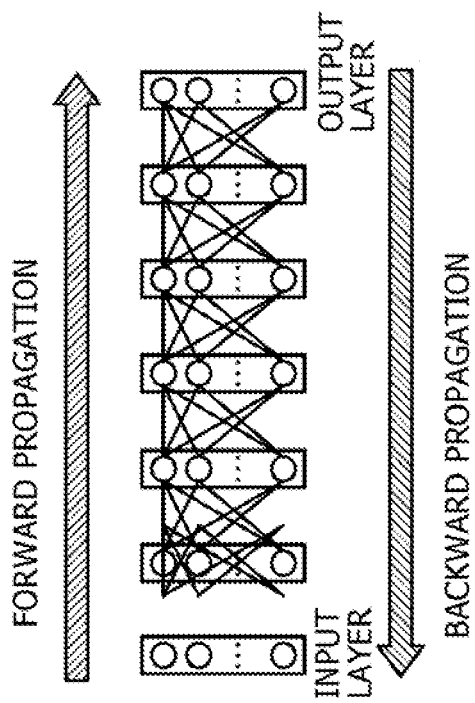

Here, an example of the learning skip used in the first embodiment will be described. FIG. 3 is a diagram for explaining machine learning of the information processing device 10 according to the first embodiment. As illustrated in FIG. 3, in deep learning of a machine learning model, machine learning (calculation processing) through forward propagation and processing for updating weights or the like through backward propagation are executed. Therefore, the information processing device 10 stops update of weight information from an iteration in which learning is progressed to some extent at the time of updating through the backward propagation. At this time, the update in an input-side layer is stopped first. This is because, although there is a case where learning accuracy does not reach target accuracy when stopping an output side, the effect on the accuracy on the input side is low.

In this way, the information processing device 10 can reduce not only the calculation of the error gradient but also the calculation of the backward propagation and can achieve both of the reduction in time before learning convergence and improvement in accuracy.

Functional Configuration

Figure 4:
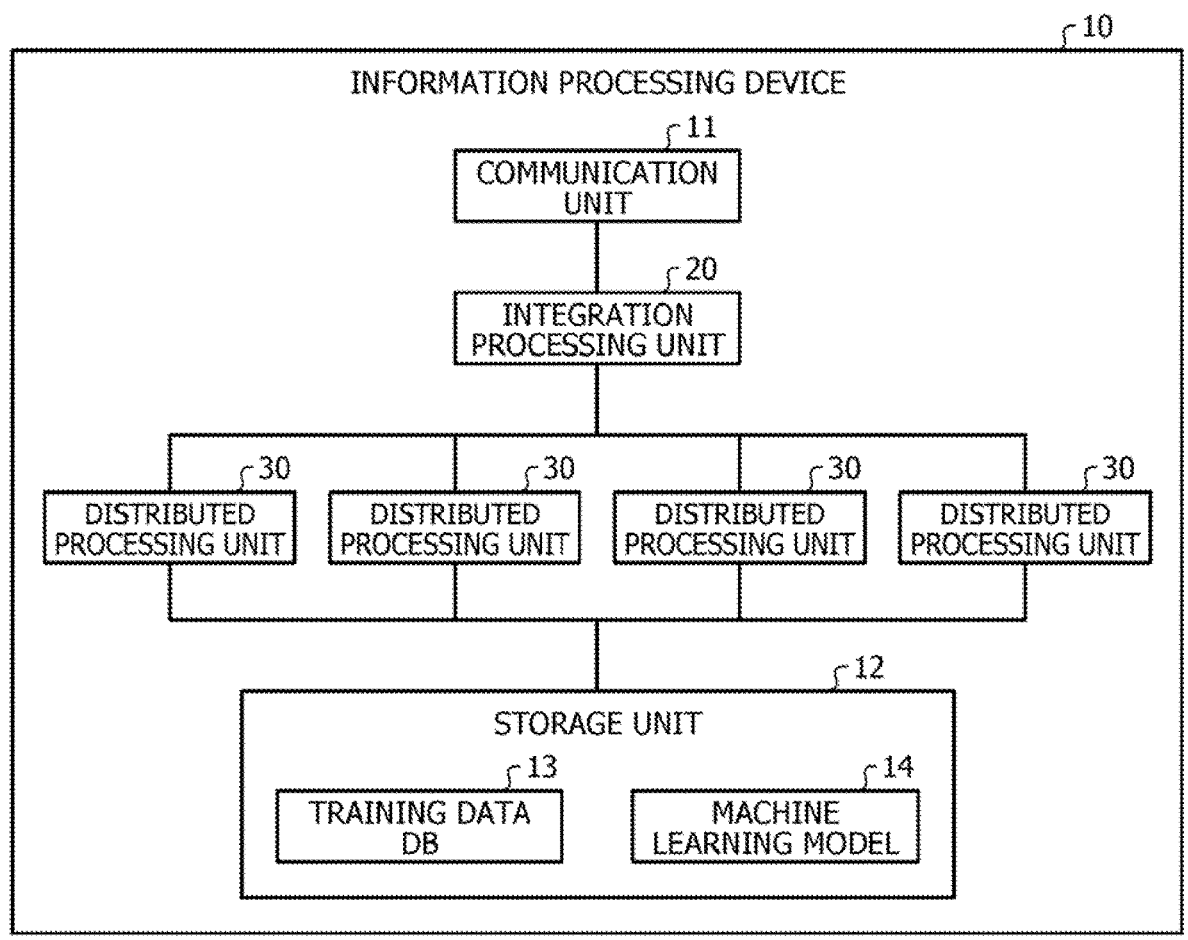
FIG. 4 is a functional block diagram illustrating a functional configuration of the information processing device according to the first embodiment.

FIG. 4 is a functional block diagram illustrating a functional configuration of the information processing device 10 according to the first embodiment. As illustrated in FIG. 4, the information processing device 10 includes a communication unit 11, a storage unit 12, an integration processing unit 20, and a plurality of distributed processing units 30.

The communication unit 11 is a processing unit that controls communication with another device, and is implemented by, for example, a communication interface or the like. For example, the communication unit 11 transmits and receives various types of data, various instructions, or the like to and from an administrator's terminal.

The storage unit 12 is a processing unit that stores various types of data, various programs, or the like and is implemented by, for example, a memory, a hard disk, or the like. The storage unit 12 stores a training data DB 13 and a machine learning model 14.

The training data DB 13 is an example of a dataset that stores training data used for machine learning of the machine learning model 14. For example, each piece of the training data stored in the training data DB 13 includes image data and a teacher label. Note that the dataset of the training data can be divided into subsets (batch size) in arbitrary units.

The machine learning model 14 is a model generated through machine learning such as DL and is an example of a model using a multi-layer neural network including a plurality of layers. For example, in a case where image data is input, the machine learning model 14 classifies an animal in the image. Note that a DNN, a convolutional neural network (CNN), or the like can be adopted as the machine learning model 14.

The integration processing unit 20 is a processing unit that controls the entire information processing device 10 and is implemented by, for example, a CPU. For example, the integration processing unit 20 instructs each distributed processing unit 30 to, for example, start or end the distributed processing of machine learning and machine learning and performs overall control regarding machine learning.

Each distributed processing unit 30 is a processing unit that executes the distributed processing of machine learning and is implemented by, for example, a GPU. For example, each distributed processing unit 30 generates the machine learning model 14 through machine learning using each piece of the training data stored in the training data DB 13 in response to the instruction from the integration processing unit 20.

Details of Distributed Processing Unit

Figure 5:
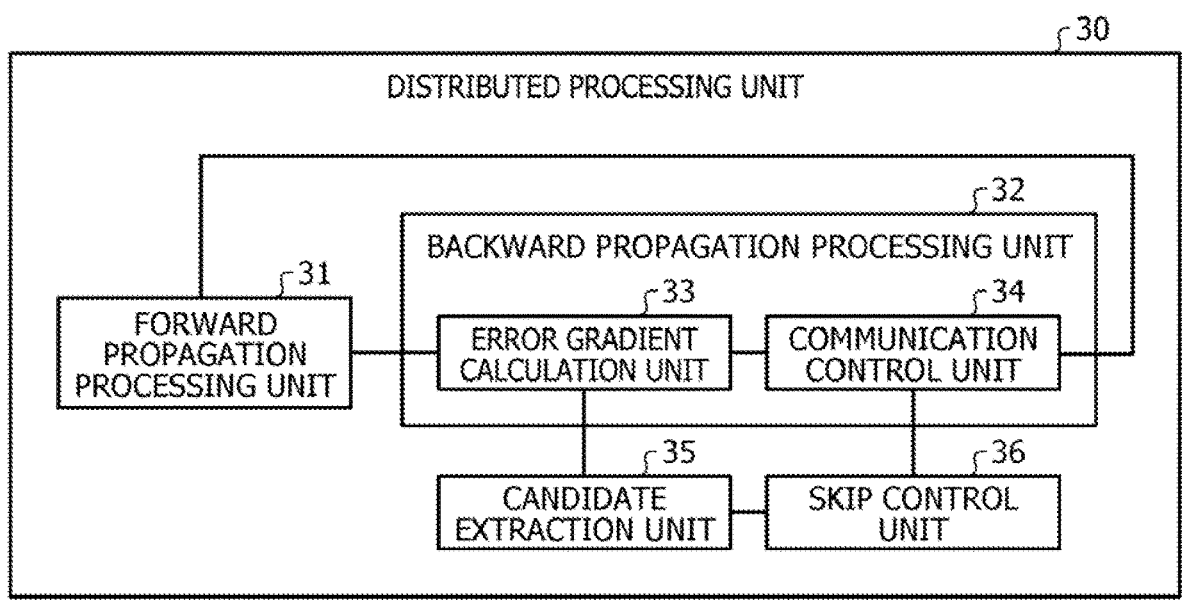
FIG. 5 is a diagram for explaining details of a distributed processing unit.

Next, details of each distributed processing unit 30 will be described. Note that each distributed processing unit 30 has a similar configuration. FIG. 5 is a diagram for explaining details of the distributed processing unit 30. As illustrated in FIG. 5, the distributed processing unit 30 includes a forward propagation processing unit 31, a backward propagation processing unit 32, a candidate extraction unit 35, and a skip control unit 36.

The forward propagation processing unit 31 is a processing unit that executes forward propagation processing on each layer of the machine learning model 14. Specifically, for example, because the forward propagation processing unit 31 performs so-called Forward Propagation, detailed description will be omitted. Briefly, for example, the forward propagation processing unit 31 inputs image data that is training data to a top layer (input layer) of the machine learning model 14 and acquires a prediction result (classification result) that is a result of calculating continuous numerical values from the input layer toward the last layer (output layer) of the machine learning model 14 from the output layer. Then, the forward propagation processing unit 31 calculates an error between the prediction result and the teacher label using a squared error or the like, calculates an error function, and outputs the calculated values to the backward propagation processing unit 32.

The backward propagation processing unit 32 is a processing unit that includes an error gradient calculation unit 33 and a communication control unit 34, calculates an error of each parameter of the machine learning model 14 by a backward propagation method using the error function input from the forward propagation processing unit 31, and updates the parameter. In other words, for example, the backward propagation processing unit 32 performs so-called Backward propagation.

For example, the backward propagation processing unit 32 calculates an error gradient of an edge weight between nodes of a neural network in an order (reverse order) from the output layer of the machine learning model 14 toward the input layer. The error gradient corresponds to a value obtained by partially differentiating an error by a weight in a case where the error is assumed as a function of the weight and represents a change amount of an error when the weight of the edge is slightly changed. Then, the backward propagation processing unit 32 updates each parameter such as each edge weight so as to reduce an error using the error gradient.

The error gradient calculation unit 33 is a processing unit that calculates an error gradient indicating a gradient of an error with respect to each parameter of the machine learning model 14 for each of the plurality of layers included in the machine learning model 14. For example, the error gradient calculation unit 33 calculates an error gradient for each layer of the machine learning model 14 for each iteration and outputs error gradient information regarding the error gradient to the candidate extraction unit 35.

Here, at the time of calculating the error gradient, the error gradient calculation unit 33 suppresses the calculation of the error gradient for a layer determined to suppress learning (learning skip layer). Furthermore, the error gradient calculation unit 33 can set only the final layer at the position farthest from the input layer in each block to be described later as an error gradient calculation target. Note that various known methods can be adopted as the method for calculating the error gradient.

The communication control unit 34 is a processing unit that performs AllReduce communication between the GPUs. For example, the communication control unit 34 sums the error gradient calculated by the plurality of GPUs for each edge weight by transmitting and receiving the error gradients between the GPUs, and the error gradients of the plurality of GPUs are added. The backward propagation processing unit 32 updates various parameters of the machine learning model 14 using the information regarding the error gradient added in this way.

Furthermore, the communication control unit 34 stops the communication to the skip target layer according to a control instruction by the skip control unit 36 to be described later. Furthermore, the communication control unit 34 specifies a layer in which learning is not stopped and the error gradient calculation and the communication (Allreduce) are continued and a layer in which learning is stopped from among the layers of the machine learning model 14 and controls communication.

The candidate extraction unit 35 is a processing unit that extracts a layer to be a skip target candidate in which learning is stopped using the error information calculated by the error gradient calculation unit 33. Specifically, for example, the candidate extraction unit 35 extracts a layer having a small displacement of the error gradient between iterations from among the layers as a skip candidate.

Figure 6:
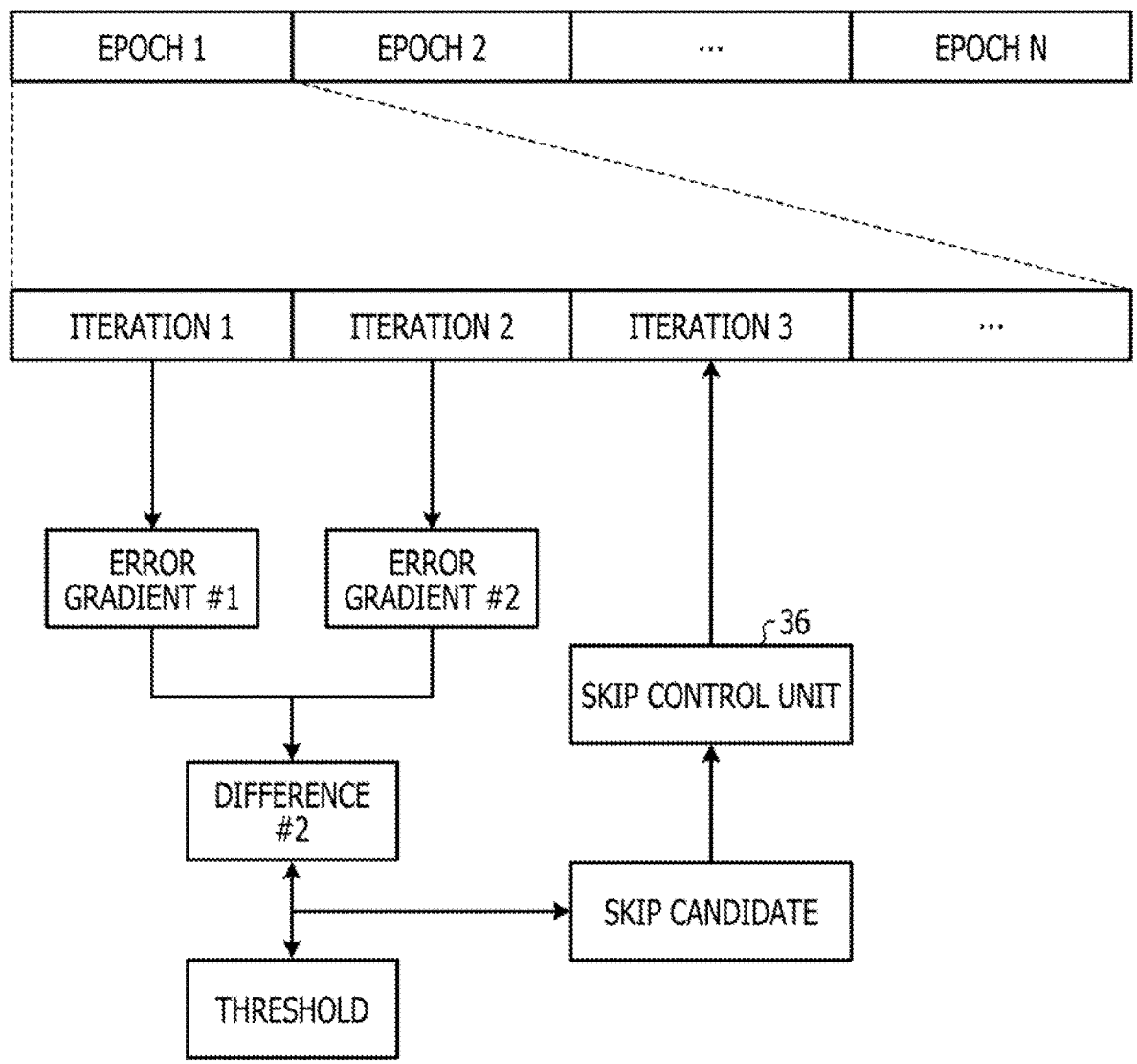
FIG. 6 is a diagram for explaining detection of a skip candidate.

FIG. 6 is a diagram for explaining detection of a skip candidate. Although a certain layer is described with reference to FIG. 6, processing illustrated in FIG. 6 is executed for each layer. As illustrated in FIG. 6, the candidate extraction unit 35 extracts a skip candidate each time when an iteration in each epoch is completed.

For example, the candidate extraction unit 35 calculates and holds an error gradient #1 at a timing when an iteration 1 of an epoch 1 ends. Thereafter, when an iteration 2 of the epoch 1 ends, the candidate extraction unit 35 calculates and holds an error gradient #2, calculates a difference #2 (for example, difference between absolute values) that is a difference between the error gradients #1 and #2, and compares the difference #2 with a threshold.

Here, in a case where the difference #2 is less than the threshold, the candidate extraction unit 35 determines that the layer is a layer in which learning is sufficiently progressed and notifies the skip control unit 36 of the information for specifying the layer as the skip candidate. On the other hand, in a case where the difference #2 is equal to or more than the threshold, the candidate extraction unit 35 determines that learning is not sufficient, and maintains normal learning without setting the layer as a skip candidate.

Figure 7:
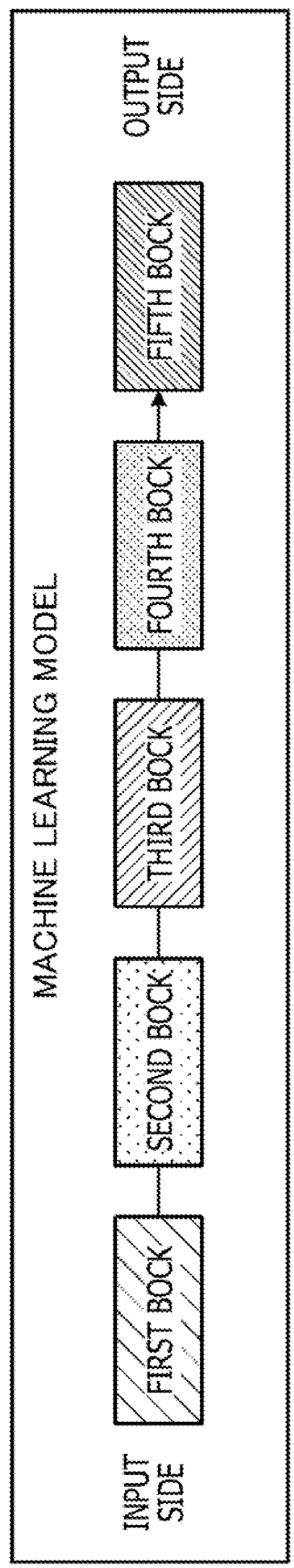
FIG. 7 is a diagram for explaining block division of a machine learning model.

Furthermore, the candidate extraction unit 35 can divide the plurality of layers included in the machine learning model 14 into blocks and determine whether or not each block is a skip candidate. FIG. 7 is a diagram for explaining block division of the machine learning model 14. As illustrated in FIG. 7, the candidate extraction unit 35 generates a plurality of blocks by dividing the layers from the input layer to the output layer of the machine learning model 14 in an order from the input layer into blocks each including a predetermined number of layers. For example, the candidate extraction unit 35 generates a first block, a second block, a third block, a fourth block, and a fifth block. At this time, the candidate extraction unit 35 can exclude the output layer, a fully connected layer, and a layer that is two layers before the fully connected layer from targets of blocking.

In this case, regarding each block, the candidate extraction unit 35 can determine whether or not the block is a skip candidate by calculating error gradients of layers belonging to each block and performing comparison with the threshold described above using the average value. As another example, regarding each block, the candidate extraction unit 35 can determine whether or not the block is a skip candidate by calculating an error gradient of the final layer (layer closest to output layer) of the layers belonging to each block and performing the comparison with the threshold described above using the error gradient.

The skip control unit 36 is a processing unit that controls a learning rate used to perform learning skip for a layer determined as a skip candidate by the candidate extraction unit 35 or each layer belonging to the block. Note that, in the following, a block unit will be described as an example.

Specifically, for example, the decrease in the final attainment accuracy tends to be smaller when learning is suppressed (learning skip) after the learning rate of the layer in which learning is suppressed (stopped) decreases to some extent. Therefore, the skip control unit 36 introduces a braking distance (BRAKING_DISTANCE: BD) of the learning rate and suppresses learning in a stepwise manner with respect to each layer belonging to the skip candidate block. Note that the BD is a hyperparameter.

For example, the skip control unit 36 does not suddenly stop learning of each layer belonging to the skip candidate block and suppresses the learning after decreasing the learning rate using the BD that depends on the iteration when a command to stop learning is issued. More specifically, in a case where an LR scheduler used for learning of the machine learning model 14 is a POW2, the skip control unit 36 reduces the BD similarly to the POW2 using the formula (1).

$$\text{BD attenuation rate} = ((\text{BD} - \text{iteration})/\text{BD})^2 \quad \text{formula (1)}$$

Figure 8:
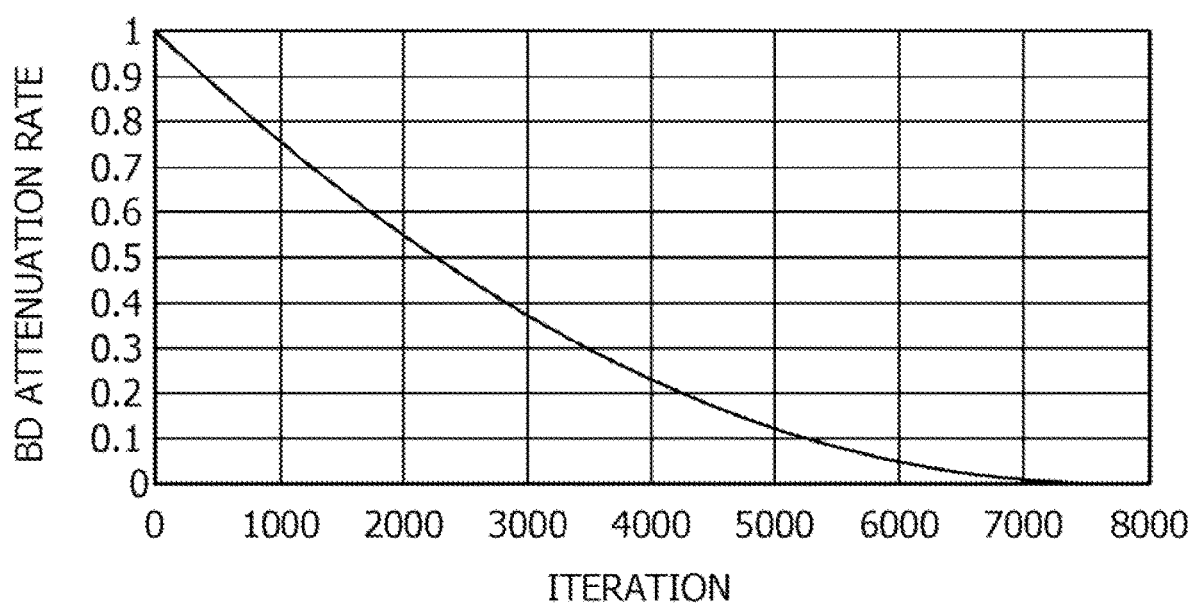
FIG. 8 is a diagram for explaining a relationship between a decrease in an attenuation rate and a braking distance.

FIG. 8 is a diagram for explaining a relationship between a decrease in an attenuation rate and a braking distance. As illustrated in FIG. 8, the skip control unit 36 gradually reduces the BD that is a braking distance of an LR to 7700 that is the set number of iterations for each iteration by multiplying the attenuation rate indicated in the formula (1), and deteriorates the learning rate. Note that the BD in the formula (1) is a predetermined set value, and the iteration (iteration) is the number of iterations at the time of calculation. FIG. 8 is an example in which BD=7700 is satisfied.

Figure 9:
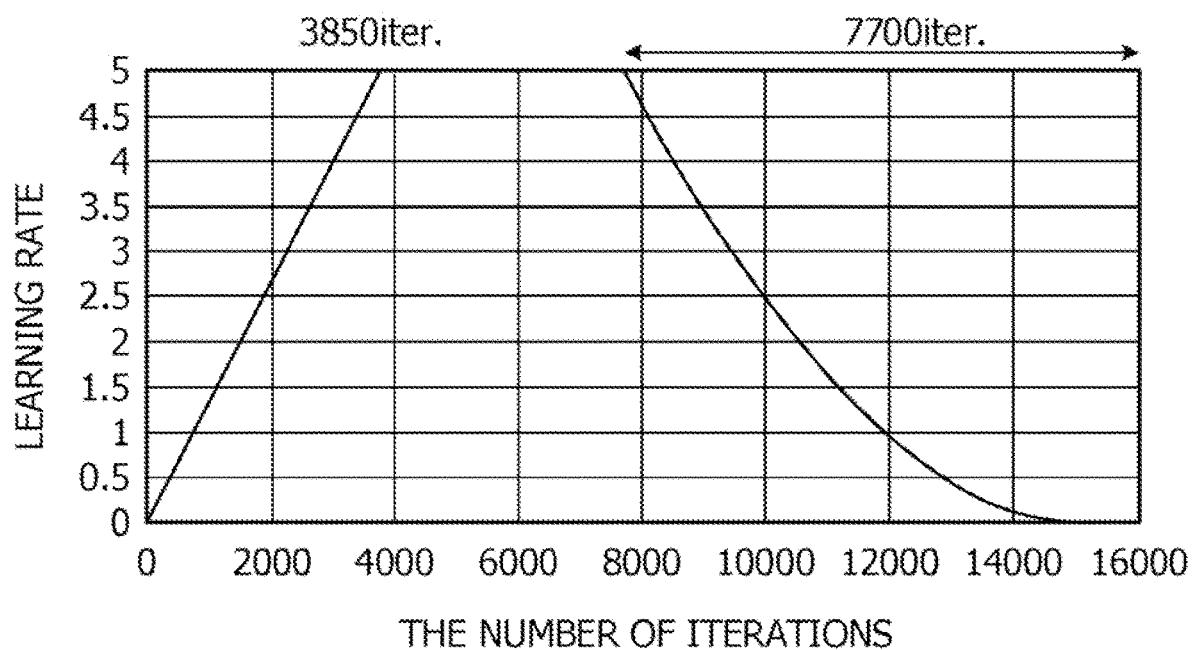
FIG. 9 is a diagram for explaining control of a learning rate before learning skip.

Here, an example will be described where learning skip is performed using the attenuation rate described above for each layer belonging to the block determined as a skip candidate. FIG. 9 is a diagram for explaining control of the learning rate before learning skip. As illustrated in FIG. 9, the skip control unit 36 performs machine learning with LR=5 when warming up (3850 iterations) is completed. Then, when the layer is determined as a skip candidate when the iteration is 7980, the skip control unit 36 calculates the LR at the time of the iteration using the formula (2) and performs machine learning using the calculated LR. In this way, the skip control unit 36 calculates the LR for each iteration and performs machine learning using the calculated LR.

$$\text{LR} = \text{End LR} + (\text{LR at the time of BD start} - \text{End LR}) \times ((\text{BD} - (\text{iter.} - \text{BD start iter.}))/\text{BD})^2 \quad \text{formula (2)}$$

Note that "LR" in the formula (2) is a learning rate to be calculated that is used for learning. "End LR" is an LR when it is determined to perform learning skip, and the learning rate is repeatedly attenuated (decreased) until the LR reaches the "End LR". "LR at the time of BD start" is an LR at the time of initial setting. "Iter." is the number of iterations at the time of calculation. Because "LR" is calculated for each iteration after being determined as a skip candidate, the number of iterations at that time is used. "iter. at the time of BD start" is the number of iterations when the attenuation of the learning rate is started. In the example in FIG. 9, BD=7700 iterations, warming up=3850 iterations, an initial value (Base LR) corresponding to "LR at the time of BD start"=5, the final LR (End LR)=0.0001, and "iter. at the time of BD start"=7980 iterations are satisfied.

As described above, the skip control unit 36 does not suddenly stop learning of each layer belonging to the skip candidate block and performs learning skip after the learning rate is gradually decreased using the BD depending on the iteration and reaches a target learning rate. At this time, the skip control unit 36 performs learning skip in an order from the block close to the input layer so as to improve learning accuracy and reduce the final number of epochs.

That is, for example, in a case where a certain block B is determined as a skip candidate, the skip control unit 36 determines whether or not learning skip control processing using the BD described above is executed on a block A previous to the block B. Here, in a case where the learning skip control processing is executed on the block A, the skip control unit 36 executes the learning skip control processing on the block B. On the other hand, in a case where the learning skip control processing is not executed on the block A, the skip control unit 36 does not start the learning skip control processing on the block B.

Figure 10:
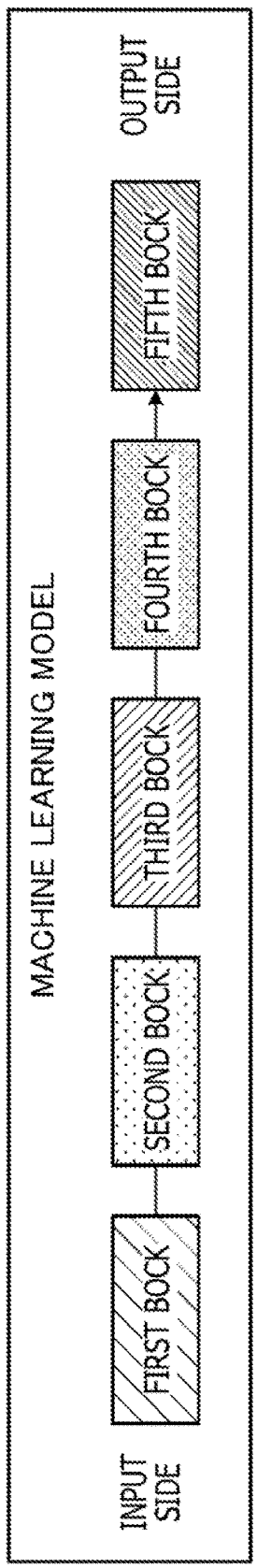
FIG. 10 is a diagram for explaining learning skip of an entire machine learning model.
Figure 10:
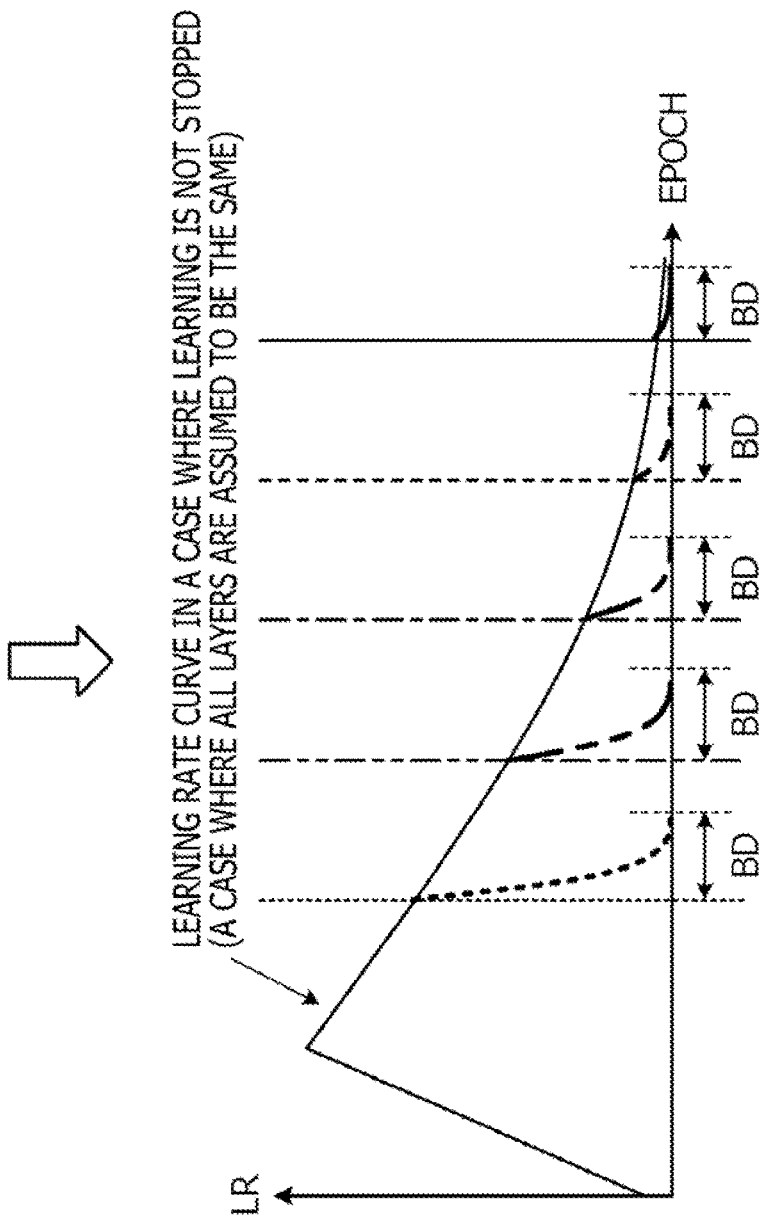

FIG. 10 is a diagram for explaining learning skip of the entire machine learning model 14. As illustrated in FIG. 10, the skip control unit 36 performs division into a first block, a second block, a third block, a fourth block, and a fifth block in an order from the input side. Then, after warming up ends, the skip control unit 36 controls the learning rate as in typical machine learning.

Then, when the first block is determined as a learning skip target, the skip control unit 36 performs machine learning in which the learning rate is more largely decreased than normal learning for each iteration according to the formula (2). Thereafter, when the second block is determined as a learning skip target, the skip control unit 36 performs machine learning in which the learning rate is more largely decreased than normal learning for each iteration according to the formula (2). In this way, the skip control unit 36 performs learning skip in an order from the block close to the input layer.

Flow of Processing

Figure 11:
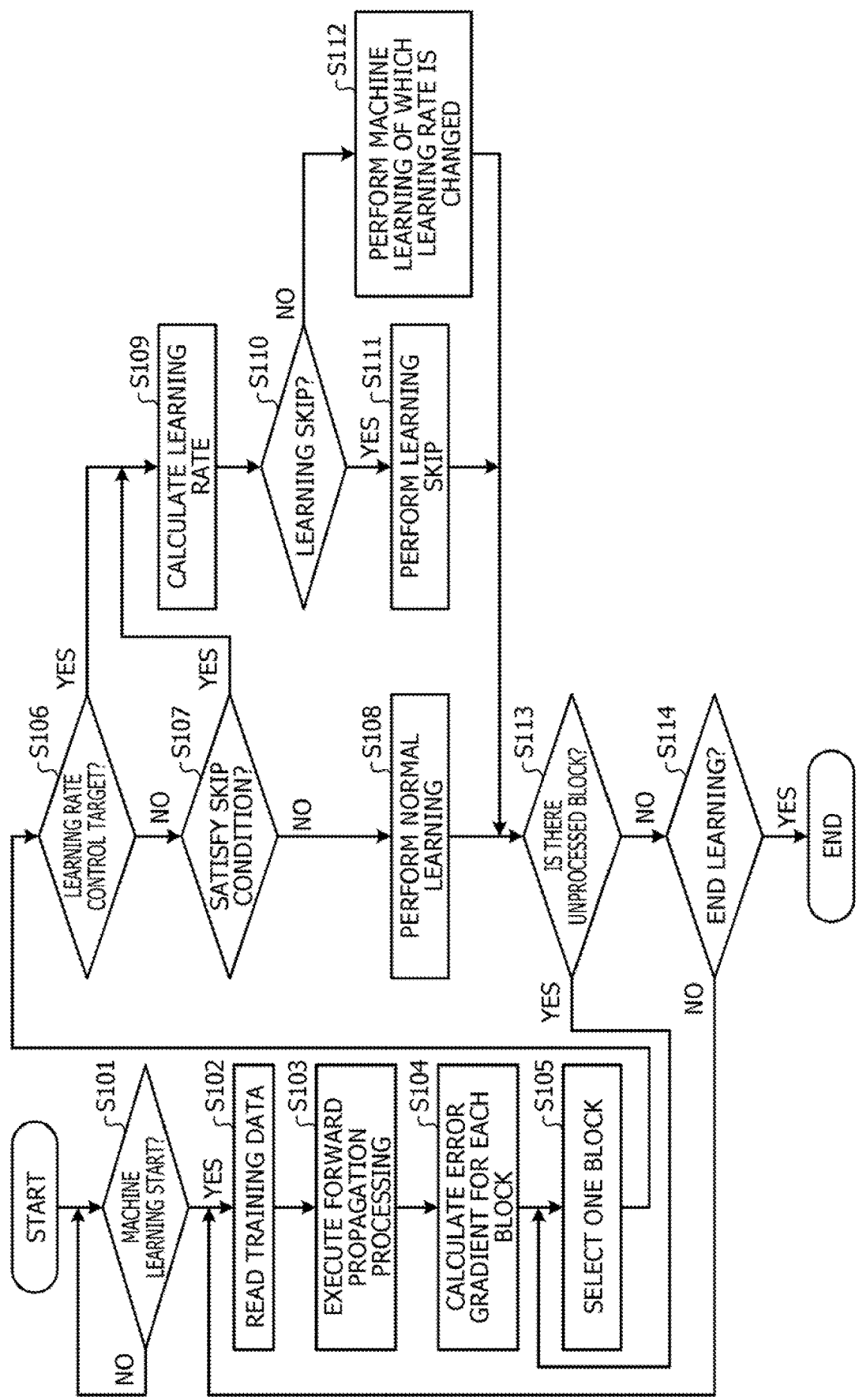
FIG. 11 is a flowchart illustrating a flow of machine learning processing according to the first embodiment.

FIG. 11 is a flowchart illustrating a flow of machine learning processing according to the first embodiment. As illustrated in FIG. 11, when machine learning is started (S101: Yes), the forward propagation processing unit 31 reads training data (S102) and executes forward propagation processing (S103).

Subsequently, the backward propagation processing unit 32 calculates an error gradient for each block (S104). Then, the candidate extraction unit 35 selects one block (S105) and determines whether or not the block has been set as a learning rate control target (S106).

Here, in a case where the block has not been set as the learning rate control target yet (S106: No), the candidate extraction unit 35 determines whether or not a skip condition is satisfied (S107). For example, the candidate extraction unit 35 determines whether or not a block previous to the current processing target block is a learning skip target in order to skip blocks from the input side in a stepwise manner.

Then, in a case where the target block does not satisfy the skip condition (S107: No), the skip control unit 36 determines normal learning so that the backward propagation processing unit 32 learns the target block as usual (S108).

On the other hand, in a case where the target block satisfies the skip condition (S107: Yes), or in a case where the target block is already set as the learning rate control target (S106: Yes), the skip control unit 36 calculates the learning rate (S109).

Here, the skip control unit 36 determines to perform learning skip on the basis of the calculated learning rate (S110). For example, in a case where the learning rate is equal to or less than a threshold (setting value), the skip control unit 36 determines to perform learning skip, and in a case where the learning rate is larger than the threshold (setting value), the skip control unit 36 determines to perform machine learning with a decreased learning rate, not learning skip.

Then, in a case where it is determined to perform learning skip (S110: Yes), the skip control unit 36 suppresses machine learning on the target block by instructing the backward propagation processing unit 32 to perform learning skip (S111).

On the other hand, in a case where it is determined not to perform learning skip (S110: No), the skip control unit 36 performs machine learning of which a learning rate is changed on the target block by instructing the backward propagation processing unit 32 to change the learning rate (S112).

Thereafter, in a case where there is an unprocessed block (S113: Yes), the candidate extraction unit 35 repeats processing in and subsequent to S105. In a case where there is not unprocessed layer (S113: No), the forward propagation processing unit 31 determines whether or not to end machine learning (S114). For example, the forward propagation processing unit 31 determines whether or not arbitrary termination criterion is satisfied such as whether or not accuracy reaches target accuracy or whether or not the specified number of epochs are executed.

Here, in a case where machine learning is continued (S114: No), the forward propagation processing unit 31 repeats processing in S102 and subsequent processing, and in a case where machine learning ends (S114: Yes), the forward propagation processing unit 31 ends machine learning and displays a learning result or the like.

Effects

As described above, the information processing device 10 can largely reduce unnecessary calculations and update processing by skipping weight update processing and back-propagation (backpropagation) processing on a layer in which machine learning ends in each block in the machine learning model 14. Furthermore, the information processing device 10 can increase the speed of the entire machine learning model 14 while suppressing deterioration in the accuracy and maintaining the accuracy by applying the braking distance (BD) of the learning rate.

Furthermore, the information processing device 10 can improve the accuracy of the machine learning model 14 by applying the braking distance (BD) of the learning rate as compared with a case where learning skip is simply performed or a case where learning skip is not performed at all. In a case where the information processing device 10 (node) mounting a plurality of GPUs is used or a case where parallel processing configured by a plurality of information processing devices 10 is executed, a rate used for communication between the GPUs, communication between nodes, aggregation processing, and reflection processing increases. Therefore, an effect of the increase in the speed achieved by reducing the unnecessary calculations and update processing further increases.

Figure 12:
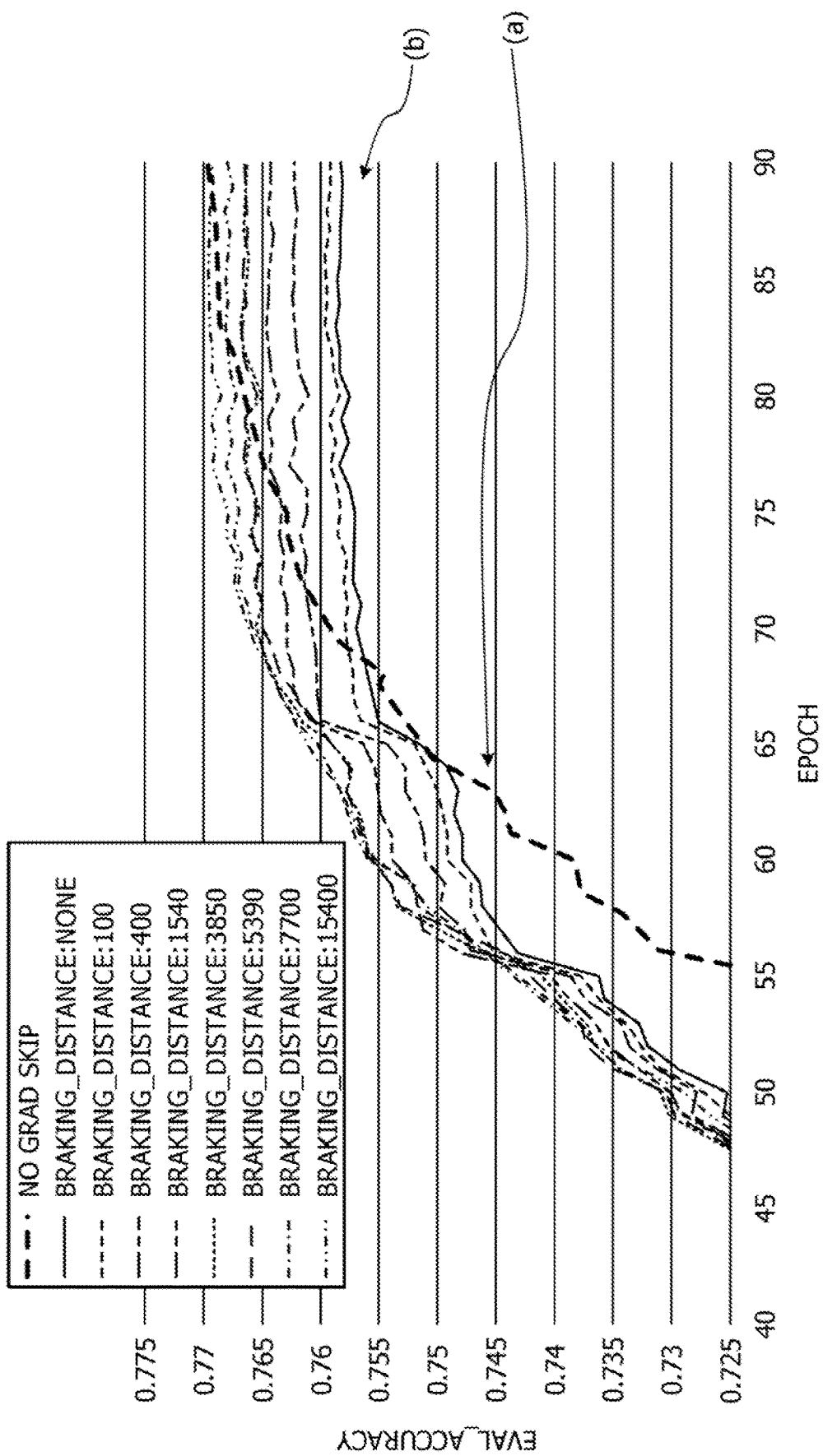
FIG. 12 is a diagram for explaining an effect when a braking distance of a learning rate is controlled.

FIG. 12 is a diagram for explaining an effect when the braking distance of the learning rate is controlled. The vertical axis in FIG. 12 indicates accuracy, and the horizontal axis in FIG. 12 indicates the number of epochs. The learning conditions in the example illustrated in FIG. 12 are that the number of times of execution is 90 epochs, the LR scheduler is the POW2, learning skip start timings are respective learning epochs of 25, 35, 45, 55, and 65, and division is performed into five blocks ([0 to 5 layers], [6 to 35 layers], [36 to 74 layers], [75 to 131 layers], and [132 to 158 layers]).

Furthermore, in such conditions, a case of machine learning to which learning skip is not applied (no Grad Skip), a case of machine learning in which learning skip is performed and skip is suddenly performed (no BRAKING_DISTANCE), and a case of each machine learning in which BRAKING_DISTANCE is changed (BD=100, 400, 1540, 3850, 5390, 7700, and 15400) are indicated. Note that a case of machine learning to which the learning skip is not applied is illustrated in (a) of FIG. 12, and a case of machine learning with no BRAKING_DISTANCE is illustrated in (b) of FIG. 12.

As illustrated in FIG. 12, learning accuracy in a case where learning skip is not performed illustrated in (a) of FIG. 12 is higher than that in a case of machine learning with no BRAKING_DISTANCE illustrated in (b) of FIG. 12. This is because machine learning is performed on all the layers. On the other hand, learning accuracy of each machine learning in which BRAKING_DISTANCE is changed is higher than that in a case of machine learning with no BRAKING_DISTANCE.

Furthermore, as illustrated in FIG. 12, the longer BRAKING_DISTANCE is, the longer machine learning is continued. Therefore, final accuracy deterioration can be prevented. Furthermore, when a start time of learning skip and the braking distance are appropriately set, accuracy equivalent to that of normal machine learning with no learning skip can be achieved. That is, for example, it is possible to prevent the deterioration in the accuracy when the braking distance is dropped to an appropriate local solution and learning is gradually stopped than when the braking distance is set to zero and learning is suddenly stopped.

Figure 13:
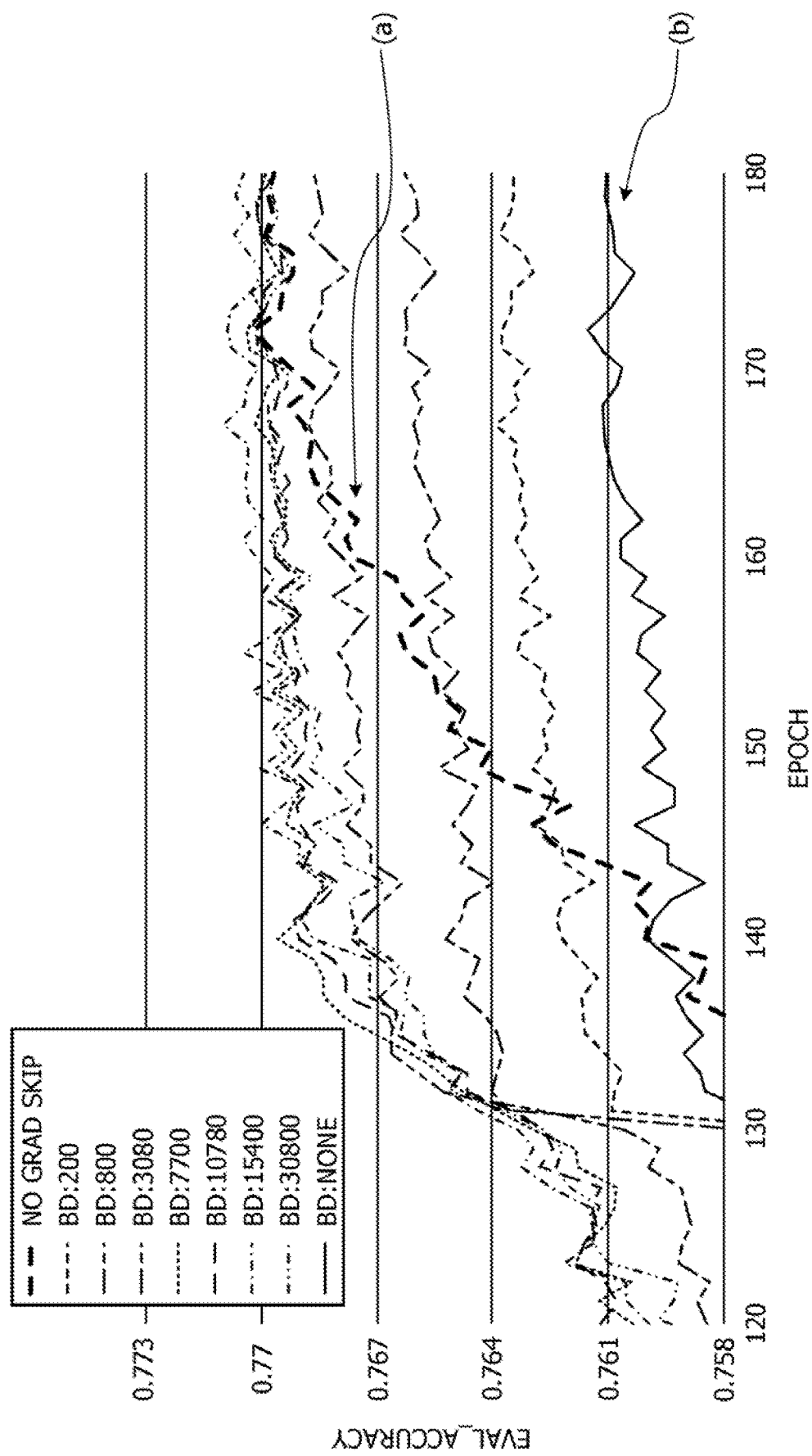
FIG. 13 is a diagram for explaining improvement in accuracy when the braking distance of the learning rate is controlled.

Next, a case will be described where accuracy of a case where the braking distance of the learning rate is controlled is less than that of normal machine learning depending on conditions. FIG. 13 is a diagram for explaining accuracy improvement when the braking distance of the learning rate is controlled. The vertical axis in FIG. 13 indicates accuracy, and the horizontal axis in FIG. 13 indicates the number of epochs. The learning conditions in the example illustrated in FIG. 13 are that the number of times of execution is 180 epochs, the LR scheduler is the POW2, learning skip start timings are respective learning epochs of 50, 70, 90, 110, and 130, and division is performed into five blocks ([0 to 5 layers], [6 to 35 layers], [36 to 74 layers], [75 to 131 layers], and [132 to 158 layers]). Note that a case of machine learning to which the learning skip is not applied is illustrated in (a) of FIG. 13, and a case of machine learning with no BRAKING_DISTANCE is illustrated in (b) of FIG. 13.

As illustrated in FIG. 13, learning accuracy of each machine learning in which BRAKING_DISTANCE is changed is higher than that in a case of machine learning with no BRAKING_DISTANCE illustrated in (b) of FIG. 13. Moreover, if the braking distance is set to be equal to or more than a certain value (7700 iterations in a case of FIG. 13), the accuracy equivalent to or more than the normal machine learning illustrated in (a) of FIG. 13 can be achieved. That is, for example, there is a possibility that attainment accuracy is higher when the braking distance is provided and learning is stopped in the middle than that when nothing is performed. This is effective as accuracy improvement measures regardless of the learning skip.

Figure 14:
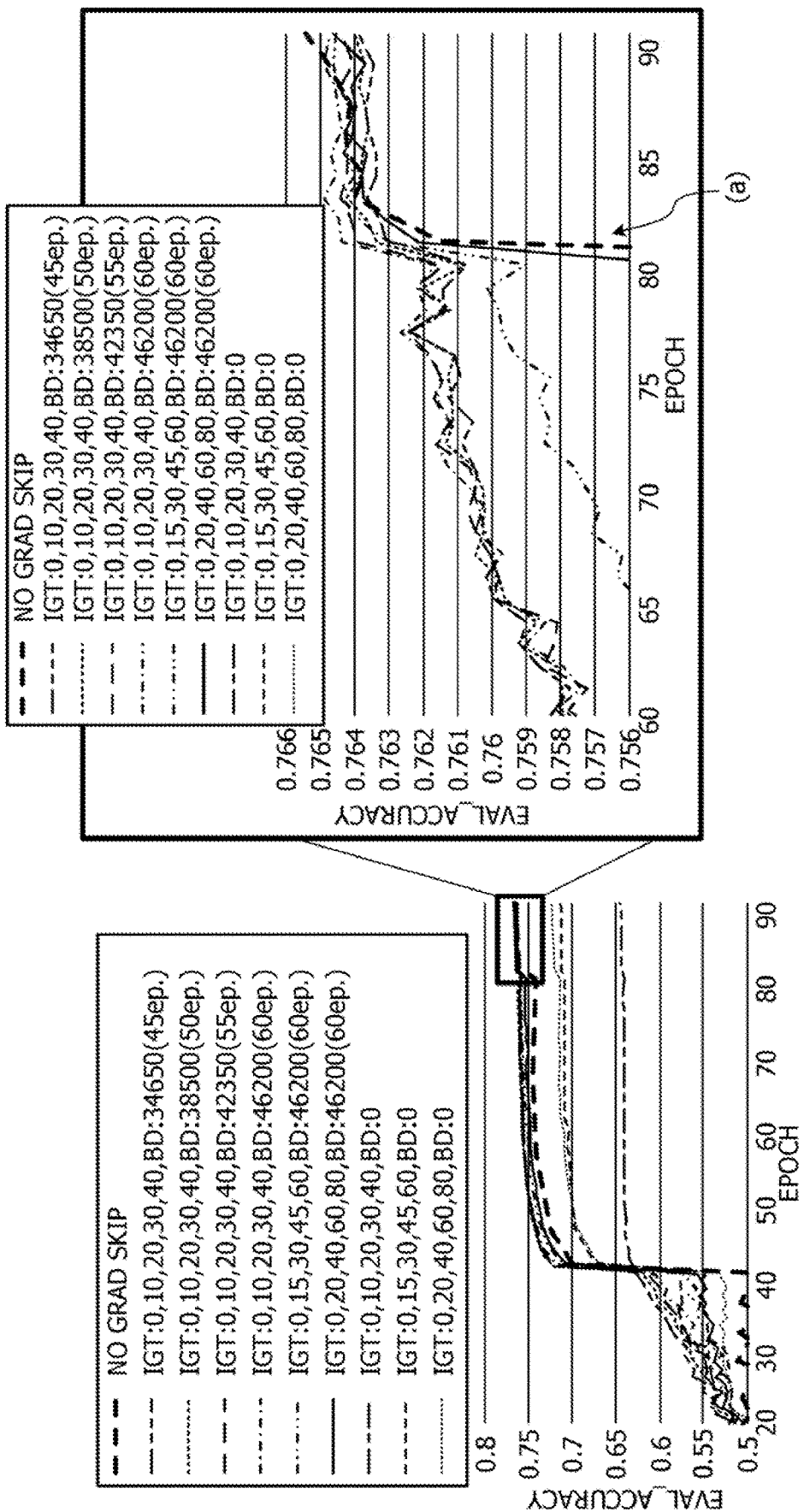
FIG. 14 is a diagram for explaining a machine learning result in a case where a scheduler other than a POW2 is used.

Furthermore, in the example described above, a case has been described where the POW2 which is the same as the LR scheduler is used to control the BD. However, the present embodiment is not limited to this. FIG. 14 is a diagram for explaining a machine learning result in a case where a scheduler other than the POW2 is used. The vertical axis in FIG. 14 indicates accuracy, and the horizontal axis in FIG. 14 indicates the number of epochs. The learning conditions in the example illustrated in FIG. 14 are that the number of times of execution is 90 epochs, the LR schedulers are 40 and 80, learning skip start timings are respective learning epochs of 10, 20, 30, 40, and 50, and division is performed into five blocks ([0 to 5 layers], [6 to 35 layers], [36 to 74 layers], [75 to 131 layers], and [132 to 158 layers]).

Note that machine learning to which learning skip is not applied is illustrated in (a) of FIG. 14, each graph of BD=0 indicates a learning result obtained by performing learning skip without applying BRAKING_DISTANCE, and each graph of BD=34650 or the like is a learning result caused by the learning skip to which BRAKING_DISTANCE is applied. As illustrated in FIG. 14, even in a case where the LR scheduler is changed, machine learning can be converged with attainment accuracy equivalent to or more than the POW2 illustrated in FIG. 13. Therefore, it is found that setting of the BD is effective without depending on the LR scheduler.

Second Embodiment

While the embodiments have been described above, the embodiments may be implemented in various different modes in addition to the modes described above.

Numerical Values, Etc

The number of blocks, the number of layers, various thresholds, numerical values, the number of GPUs, or the like used in the embodiments described above are merely examples, and can be arbitrarily changed. Furthermore, the learning rate can be not only decreased but also increased. Furthermore, the learning skip can be determined for each iteration or each epoch. Note that it is preferable that the same scheduler be used as the LR scheduler and the scheduler that controls the learning rate.

Block Control, Etc

For example, in the example described above, it is possible to determine whether or not the layer is the skip target according to whether or not an average value of the error gradient of the final layer and the error gradient of each layer belonging to the block among the layers belonging to the block is equal to or less than the threshold. Furthermore, in the embodiments described above, an example has been described where skip control and BD setting are performed in block units. However, the embodiments are not limited to this, and control can be performed in layer units. For example, in a case where a plurality of layers in which the difference between the error gradients is less than the threshold is detected, the information processing device 10 can determine a predetermined number of layers in an order from the layer closer to the input layer as skip targets.

BD Setting Example

In the embodiments described above, an example has been described in which the same BD value is set to each block. However, the embodiment is not limited to this, and different BD values can be set to the respective blocks. For example, to a block close to the output layer in which machine learning is stopped in a state where machine learning is progressed, a BD value shorter than that of a block close to the input layer in which machine learning is stopped at a relatively early stage can be set.

System

Pieces of information including a processing procedure, a control procedure, a specific name, various types of data, and parameters described above or illustrated in the drawings may be optionally changed unless otherwise specified.

Furthermore, each component of each device illustrated in the drawings is functionally conceptual and does not necessarily have to be physically configured as illustrated in the drawings. In other words, for example, specific forms of distribution and integration of each device are not limited to those illustrated in the drawings. That is, for example, all or a part thereof may be configured by being functionally or physically distributed or integrated in optional units according to various types of loads, usage situations, or the like.

Moreover, all or any part of individual processing functions performed in each device may be implemented by a CPU and a program analyzed and executed by the CPU, or may be implemented as hardware by wired logic.

Hardware

Figure 15:
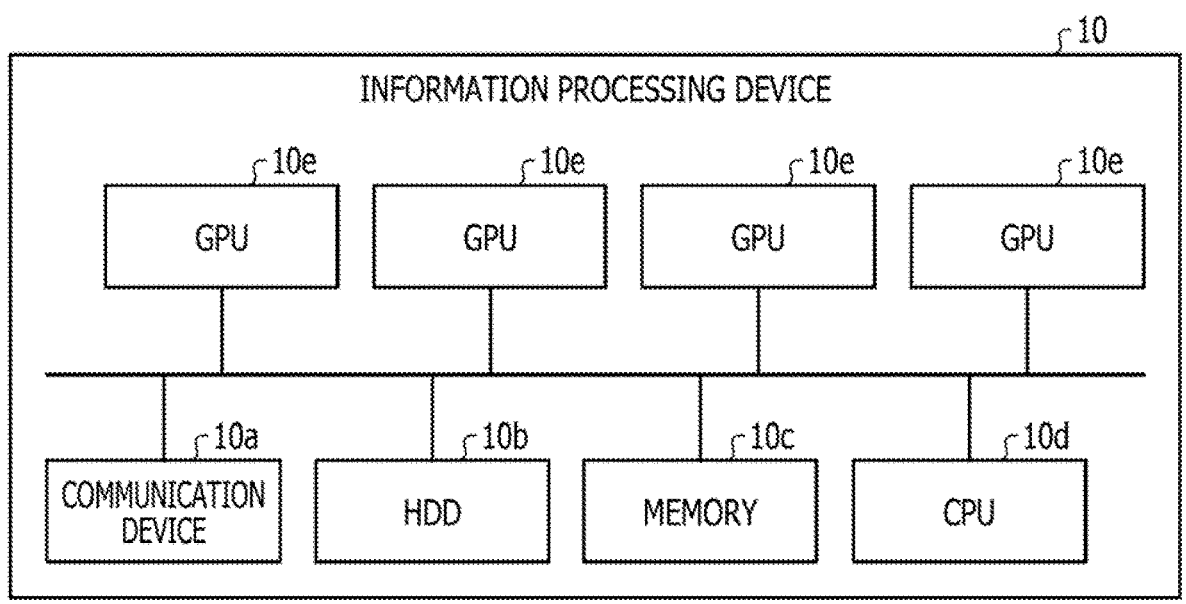
FIG. 15 is a diagram for explaining a hardware configuration example.

Next, a hardware configuration example of the information processing device 10 described in the above embodiment will be described. FIG. 15 is a diagram illustrating an exemplary hardware configuration. As illustrated in FIG. 15, the information processing device 10 includes a communication device 10a, a hard disk drive (HDD) 10b, a memory 10c, a CPU 10d, and a plurality of GPUs 10e. Furthermore, the units illustrated in FIG. 15 are mutually connected by a bus or the like.

The communication device 10a is a network interface card or the like and communicates with another server. The HDD 10b stores a program that activates the functions illustrated in FIGS. 4, 5, or the like and a DB.

The CPU 10d controls the entire information processing device 10 and, for example, reads a program regarding machine learning from the HDD 10b or the like and develops the program to the memory 10c and each GPU 10e that operates each process of machine learning reads a program for executing processing similar to each processing unit illustrated in FIG. 5 or the like from the HDD 10b or the like and develops the program to the memory 10c so as to operate the process for performing each function described with reference to FIG. 3 or the like. For example, each GPU 10e reads programs having the functions similar to the forward propagation processing unit 31, the backward propagation processing unit 32, the candidate extraction unit 35, the skip control unit 36, or the like from the HDD 10b or the like. Then, each GPU 10e executes the process for executing processing similar to the forward propagation processing unit 31, the backward propagation processing unit 32, the candidate extraction unit 35, the skip control unit 36, or the like.

As described above, the information processing device 10 operates as an information processing device that executes various processing methods by reading and executing the program. Furthermore, the information processing device 10 may also implement functions similar to the functions of the above-described embodiments by reading the program described above from a recording medium by a medium reading device and executing the read program described above. Note that the program mentioned in other embodiments is not limited to being executed by the information processing device 10. For example, the embodiment may be similarly applied to a case where another computer or server executes the program, or a case where these cooperatively execute the program.

This program may be distributed via a network such as the Internet. Furthermore, this program may be recorded in a computer-readable recording medium such as a hard disk, flexible disk (FD), compact disc read only memory (CD-ROM), magneto-optical disk (MO), or digital versatile disc (DVD), and may be executed by being read from the recording medium by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a machine learning program of training a machine learning model using a layer-wise learning rate adaptation technique that dynamically adjusts learning rates for each layer according to the learning progress, the machine learning program comprising instructions which, when executed by a computer, cause the computer to execute processing comprising:

the computer calculating, at each iteration of a plurality of iterations in the training of the machine learning model, error gradient values of a plurality of layers included in the machine learning model that includes an input layer of the machine learning model;

the computer selecting, from among the plurality of layers, one or more first layers each of which is a layer whose difference in the error gradient values between a current iteration and a previous iteration in the plurality of iterations is less than a threshold; and the computer reducing, in the training of the machine learning model, a learning rate to be applied to the selected one or more first layers in the machine learning model, over a certain period of time before performing a learning skip on the one or more first layers while continuing learning for layers other than the selected one or more first layers, thereby a reduction in the learning rate to be applied to the selected one or more first layers is greater than a reduction in a learning rate to be applied to one or more second layers, each of the one or more second layers being any of the plurality of layers other than the selected one or more first layers and being a layer whose difference in the error gradient between a current iteration and a previous iteration in the plurality of iterations is not less than the threshold.

2. The non-transitory computer-readable recording medium according to claim 1, wherein the processing further comprises:

in each iteration of the plurality of iterations, calculating the learning rate to be applied to each of the selected one or more first layers, by using a learning rate at a start of the certain period of time, and a number that indicates how many iterations have elapsed from a start of the plurality of iterations, and training the machine learning model by applying the calculated learning rate to the selected one or more first layers in the machine leaning model.

3. The non-transitory computer-readable recording medium according to claim 2, wherein the reducing of the learning rate to be applied to the selected layer is performed for each iteration of the plurality of iterations such that the learning rate to be applied to the selected layer is converged at the time when the certain period of time has elapsed.

4. The non-transitory computer-readable recording medium according to claim 2, wherein the selecting:

divides the plurality of layers into a plurality of blocks in an order from the input layer such that each block of the plurality of blocks includes multiple layers of the plurality of layers, wherein the error gradient values are average values of error gradients of the multiple layers of the block and selects, as the one or more first layers, from among the plurality of blocks, one or more first blocks each of which being a suppression target, thereby the selected block has a difference in an average value of error gradients in the multiple layers between the current iteration and the previous iteration in the plurality of iterations that is less than the threshold; and the reducing reduces, in the training of the machine learning model, the learning rate to be applied to each layer in the selected one or more first blocks, over the certain period of time before performing the learning skip on the one or more first blocks.

5. The non-transitory computer-readable recording medium according to claim 4, wherein in the selecting, multiple blocks are selected from among the plurality of blocks, each block of the multiple blocks being selected as the one or more first blocks, the reducing of the learning rate is performed for each block of the multiple blocks in an order closer to the input layer of the machine learning model.

6. The non-transitory computer-readable recording medium according to claim 4, wherein in the selecting, multiple blocks are selected from among the plurality of blocks, each block of the multiple blocks being selected as the one or more first blocks the certain period of time is individually set to each block of the multiple blocks such that the certain period of time for a downstream block is shorter than the certain period of time for an upstream block, wherein the downstream block is located further downstream in a data flow direction through the multiple blocks than the upstream block.

7. The non-transitory computer-readable recording medium according to claim 4, wherein the reducing reduces the learning rate to be applied to each layer in the selected one or more first blocks, thereby the learning rate to be applied to each layer in the selected one or more first blocks is converged at the time when the certain period of time has elapsed.

8. A machine learning method implemented by a computer of training a machine learning model using a layer-wise learning rate adaptation technique that dynamically adjusts learning rates for each layer according to the learning progress, the machine learning method comprising:

the computer calculating, at each iteration of a plurality of iterations in the training of the machine learning model, error gradients of a plurality of layers included in the machine learning model that includes an input layer of the machine learning model;

the computer selecting, from among the plurality of layers, one or more first layers each of which is a layer whose difference in the error gradient between a current iteration and a previous iteration in the plurality of iterations is less than a threshold; and the computer reducing, in the training of the machine learning model, a learning rate to be applied to the selected one or more first layers in the machine learning model, over a certain period of time before performing a learning skip on the one or more first layers while continuing learning for layers other than the selected one or more first layers, thereby a reduction in the learning rate to be applied to the selected one or more first layers is greater than a reduction in a learning rate to be applied to one or more second layers, each of the one or more second layers being any of the plurality of layers other than the selected one or more first layers and being a layer whose difference in the error gradient between a current iteration and a previous iteration in the plurality of iterations is not less than the threshold.

9. An information processing device of training a machine learning model using a layer-wise learning rate adaptation technique that dynamically adjusts learning rates for each layer according to the learning progress, the information processing device comprising:

a memory; and a processor coupled to the memory, the processor being configured to perform processing, the processing including:

the processor calculating, at each iteration of a plurality of iterations in the training of the machine learning model, error gradients of a plurality of layers included in the machine learning model that includes an input layer of the machine learning model;

the processor selecting, from among the plurality of layers, one or more first layers each of which is a layer whose difference in the error gradient between a current iteration and a previous iteration in the plurality of iterations is less than a threshold; and the processor reducing, in the training of the machine learning model, a learning rate to be applied to the selected one or more first layers in the machine learning model, over a certain period of time before performing a learning skip on the one or more first layers while continuing learning for layers other than the selected one or more first layers, thereby a reduction in the learning rate to be applied to the selected one or more first layers is greater than a reduction in a learning rate to be applied to one or more second layers, each of the one or more second layers being any of the plurality of layers other than the selected one or more first layers and being a layer whose difference in the error gradient between a current iteration and a previous iteration in the plurality of iterations is not less than the threshold.

* * * * *